US012759449B2

(12) United States Patent
Chen et al.

(10) Patent No.: US 12,759,449 B2
(45) Date of Patent: Oct. 13, 2026

(54) CONSOLE WITH MOVEABLE ARMREST

(71) Applicant: GM Global Technology Operations LLC, Detroit, MI (US)

(72) Inventors: Shuguang Chen, Shanghai (CN); Ziheng Zhang, Ningbo (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 252 days.

(21) Appl. No.: 18/756,513

(22) Filed: Jun. 27, 2024

(65) Prior Publication Data

US 2025/0388154 A1 Dec. 25, 2025

(30) Foreign Application Priority Data

Jun. 21, 2024 (CN) ........................ 202410813326.X

(51) Int. Cl.
*B60N 2/75* (2018.01)
*F16H 1/16* (2006.01)

(52) U.S. Cl.
CPC ............... *B60N 2/793* (2018.02); *B60N 2/77* (2018.02); *F16H 1/16* (2013.01)

(58) Field of Classification Search
CPC .............. B60N 2/793; B60N 2/77; F16H 1/16
See application file for complete search history.

(56) References Cited

U.S. PATENT DOCUMENTS

2023/0226961 A1* 7/2023 Im .......................... B60N 2/773 296/1.09
2023/0311776 A1 10/2023 Lone et al.
2025/0319821 A1* 10/2025 Wang ........................ B60R 7/04

FOREIGN PATENT DOCUMENTS

DE 19611892 C1 9/1997

* cited by examiner

*Primary Examiner* — Dany E Akakpo
(74) *Attorney, Agent, or Firm* — Vivacqua Crane, PLLC

(57) ABSTRACT

A center console for a vehicle includes a console defining a storage compartment and having an opening allowing access to the storage compartment, an armrest assembly moveably supported, by an articulating support structure, on the console, the articulating support structure adapted to selectively move the armrest assembly between a fully raised position, wherein the armrest assembly is supported above the console and the opening to the storage compartment is accessible and a fully lowered position, wherein the armrest assembly is positioned against the console and covers the opening to the storage compartment, wherein, the articulating support structure is adapted to maintain a horizontal orientation of the armrest assembly at the fully raised position, the fully lowered position and throughout movement between the fully raised position and the fully lowered position.

20 Claims, 7 Drawing Sheets

CONSOLE WITH MOVEABLE ARMREST

INTRODUCTION

The present invention relates generally to a center console for a vehicle having a moveable armrest assembly.

BACKGROUND OF THE INVENTION

Current armrests within vehicles provide design features that include storage compartments or platforms and cup holders, etc. However, current armrest designs do not provide for automatic locking at selectively adjustable positions and are not adapted to be placed in a position to cover a storage area and automatically lock in place to secure personal items therein.

Thus, while current armrest within vehicles achieve their intended purpose, there is a need for a new and improved center console for a vehicle including a moveable armrest assembly that is selectively moveable between a fully raised position and a fully lowered position, wherein when the armrest assembly is in the fully lowered position the armrest closes off a storage area within the center console, and when the armrest assembly is at the fully raised position, the fully lowered position or any position therebetween, the armrest assembly is automatically locked in place and cannot be manually moved upward or downward between the fully lowered and fully raised positions.

SUMMARY

According to several aspects of the present disclosure, a center console for a vehicle includes a console defining a storage compartment and having an opening allowing access to the storage compartment, and an armrest assembly moveably supported, by an articulating support structure, on the console, the articulating support structure adapted to selectively move the armrest assembly between a fully raised position, wherein the armrest assembly is supported above the console and the opening to the storage compartment is accessible and a fully lowered position, wherein the armrest assembly is positioned against the console and covers the opening to the storage compartment, wherein, the articulating support structure is adapted to maintain a horizontal orientation of the armrest assembly at the fully raised position, the fully lowered position and throughout movement between the fully raised position and the fully lowered position.

According to another aspect, when the armrest assembly is in the fully lowered position, the articulating support structure is positioned entirely within the storage compartment of the console.

According to another aspect, when the armrest assembly is in the fully lowered position, the articulating support structure functions to lock the armrest assembly in the fully lowered position and securing belonging stored within the storage compartment.

According to another aspect, the articulating support structure includes a connecting rod having a lower distal end and an upper distal end, the lower distal end of the connecting rod pivotally supported on a fixed base within the storage compartment of the console, a support plate pivotally mounted to the upper distal end of the connecting rod and adapted to support the armrest assembly thereon, the connecting rod being pivotally moveable relative to the fixed base and the center console about a first axis and within a first horizontal plane, and the support plate being pivotally moveable relative to the connecting rod about a second axis and within the first horizontal plane, and a geared linkage interconnecting the fixed base to the support plate, wherein when the connecting rod pivots relative to the fixed base, the geared linkage is adapted to pivot the support plate relative to the connecting rod in a direction opposite the pivotal movement of the connecting rod.

According to another aspect, the geared linkage includes a fixed base gear fixedly mounted to the fixed base and centered on the first axis, a lower connecting rod gear rotatably supported on a lower connecting rod shaft extending from the connecting rod for rotation about a third axis, the lower connecting rod gear including a spur gear portion in engagement with the fixed base gear and a bevel gear portion, an upper connecting rod bevel gear fixedly mounted onto an upper connecting rod shaft that is rotatably supported at the upper distal end of the connecting rod for rotation about the second axis, the support plate being fixedly mounted onto the upper connecting rod shaft, and a bevel gear shaft extending between the bevel gear portion of the lower connecting rod gear and the upper connecting rod bevel gear, the bevel gear shaft having a first bevel gear fixedly attached to a first distal end of the bevel gear shaft and engaged with the bevel gear portion of the lower connecting rod gear and a second bevel gear fixedly attached to a second distal end of the bevel gear shaft and engaged with the upper connecting rod bevel gear, and wherein, pivotal motion of the connecting rod relative to the fixed base in a first rotational direction about the first axis within the first horizontal plane causes rotation of the lower connecting rod gear in the first rotational direction within a second horizontal plane that is parallel to the first horizontal plane as the lower connecting rod gear rotates about the third axis and walks around the fixed base gear, rotation of the lower connecting rod gear in the first direction within the second horizontal plane is transferred, through the bevel gear shaft, via geared engagement between the bevel gear portion of the lower connecting rod gear and the first bevel gear and geared engagement between the second bevel gear and the upper connecting rod bevel gear, wherein the upper connecting rod bevel gear rotates in a second direction, opposite the first direction, within the second horizontal plane about the second axis, and rotation of the upper connecting rod bevel gear in the second direction causes rotation of the upper connecting rod shaft, the support plate, and the armrest assembly supported on the support plate, in the second direction within the first horizontal plane.

According to another aspect, the geared linkage interconnecting the fixed base to the support plate, has a cumulative gear ratio of one-to-one (1:1), wherein when the connecting rod pivots relative to the fixed base about the first axis, and the support plate pivots relative to the connecting rod about the second axis in an direction opposite the pivotal movement of the connecting rod, the net angular rotation of the connecting rod and support plate are equal.

According to another aspect, the articulating support structure includes only a single powered drive unit that is selectively actuatable to move the armrest assembly back and forth between the fully raised position and the fully lowered position, and to support the armrest assembly at any position between and including the fully raised position and the fully lowered position.

According to another aspect, the single powered drive unit is adapted to prevent movement of the armrest assembly due to upward or downward load on the armrest assembly.

According to another aspect, the powered drive unit includes a worm gear assembly including a worm gear fixedly mounted to the lower distal end of the connecting rod, and a worm engaged with the worm gear, the worm connected to a motor adapted to selectively rotate the worm, and wherein, rotation of the worm, by the motor, causes corresponding rotation of the worm gear and the connecting rod, and attempted rotation of the worm gear, via load upward or downward on the armrest assembly, causes the worm gear assembly to lock up, preventing rotation of the connecting rod and movement of the armrest assembly due to upward or downward load on the armrest assembly.

According to another aspect, the powered drive unit includes a force sensor adapted to monitor resistance when the articulating support structure moves the armrest assembly back and forth between the fully raised and fully lowered positions, and to stop movement of the armrest assembly if measured force exceeds a pre-determined threshold.

According to several aspects of the present disclosure, a vehicle includes a center console, the center console including a console defining a storage compartment and having an opening allowing access to the storage compartment, and an armrest assembly moveably supported, by an articulating support structure, on the center console, the articulating support structure adapted to selectively move the armrest assembly between a fully raised position, wherein the armrest assembly is supported above the center console and the opening to the storage compartment is accessible and a fully lowered position, wherein the armrest assembly is positioned against the center console and covers the opening to the storage compartment, wherein, the articulating support structure is adapted to maintain a horizontal orientation of the armrest assembly at the fully raised position, the fully lowered position and throughout movement between the fully raised position and the fully lowered position.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
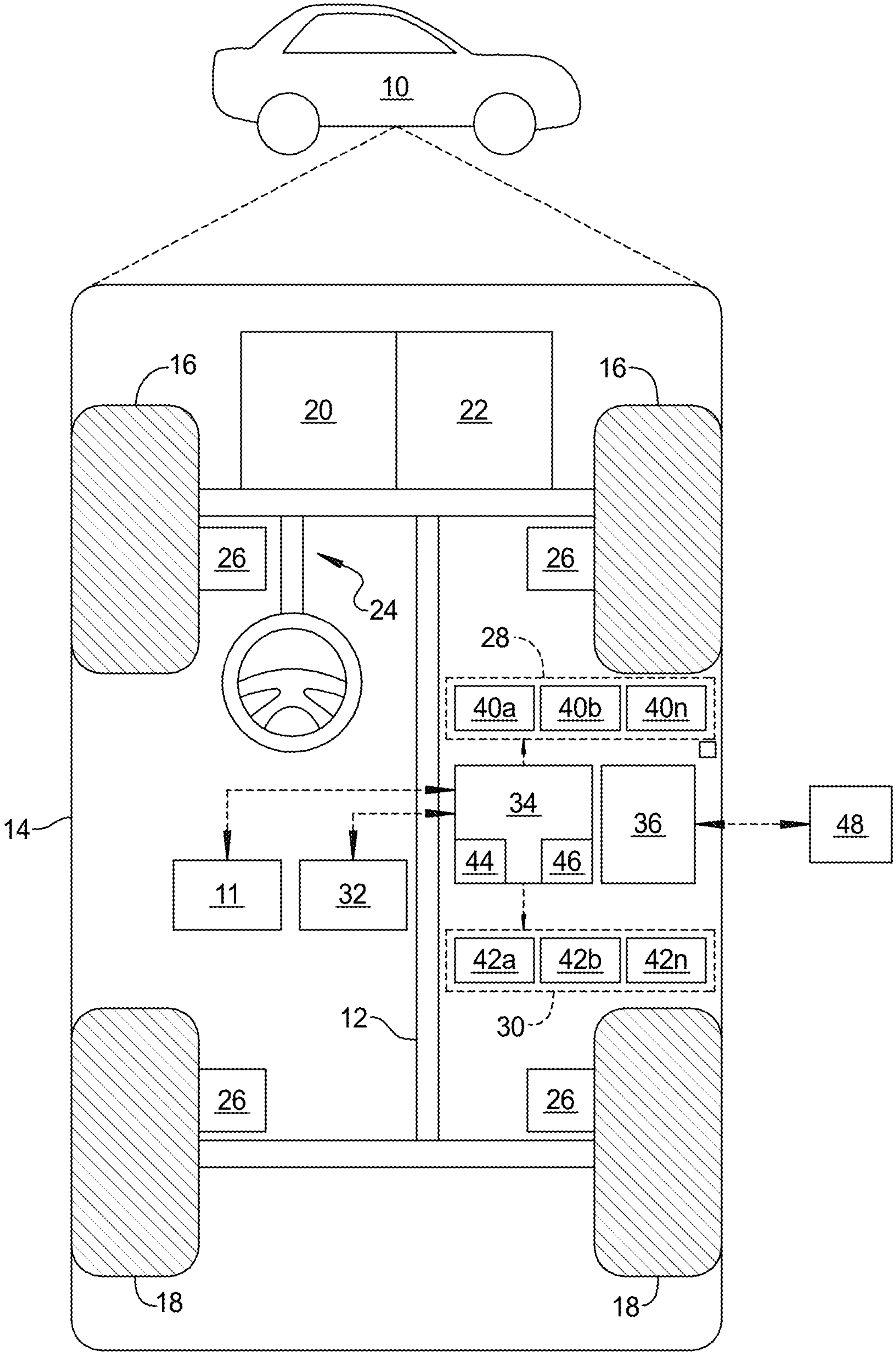
FIG. 1 is a schematic diagram of a vehicle having a center console in accordance with an exemplary embodiment of the present disclosure.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms “comprises,” “comprising,” “including,” and “having,” are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term “comprising,” is to be understood as a non-restrictive term used to describe and claim various embodiments set forth herein, in certain aspects, the term may alternatively be understood to instead be a more limiting and restrictive term, such as “consisting of” or “consisting essentially of”. Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of “consisting of,” the alternative embodiment excludes any additional compositions, materials, components, elements, features, integers, operations, and/or process steps, while in the case of “consisting essentially of” any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being “on,” “engaged to,” “connected to,” or “coupled to” another element or layer, it may be directly on, engaged, connected or coupled to the other component, element, or layer, or intervening elements or layers may be present. In contrast, when an element is referred to as being “directly on,” “directly engaged to,” “directly connected to,” or “directly coupled to” another element or layer, there may be no intervening elements or layers present. Other words used to describe the relationship between elements should be interpreted in a like fashion (e.g., “between” versus “directly between,” “adjacent” versus “directly adjacent,” etc.). As used herein, the term “and/or” includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as “first,” “second,” and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as “before,” “after,” “inner,” “outer,” “beneath,” “below,” “lower,” “above,” “upper,” and the like, may be used herein for ease of description to describe one element or feature’s relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term “about” whether or not “about” actually appears before the numerical value. “About” indicates that the stated numerical value allows some slight imprecision (with some approach to exactness in the value; approximately or reasonably close to the value; nearly). If the imprecision provided by “about” is not otherwise understood in the art with this ordinary meaning, then “about” as used herein indicates at least variations that may arise from ordinary methods of measuring and using such parameters. For example, “about”, with reference to percentages, comprises a variation of plus/minus 5%, “about”, with reference to temperatures, comprises a variation of plus/minus five degrees, and “about”, with reference to distances, comprises plus/minus 10%. In addition, disclosure of ranges includes disclosure of all values and further divided ranges within the entire range, including endpoints and sub-ranges given for the ranges. In addition, disclosure of ranges includes disclosure of all values and further divided ranges within the entire range, including endpoints and sub-ranges given for the ranges.

Example embodiments will now be described more fully with reference to the accompanying drawings.

In accordance with an exemplary embodiment, FIG. 1 shows a vehicle 10 with an associated center console system 11 including a center console 50. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near a respective corner of the body 14.

In various embodiments, the vehicle 10 is an autonomous vehicle. An autonomous vehicle 10 is, for example, a vehicle 10 that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the vehicle 10 is equipped with a so-called Level Four or Level Five automation system. A Level Four system indicates “high automation”, referring to the driving mode-specific performance by an automated driving system of all aspects of the dynamic driving task, even if a human driver does not respond appropriately to a request to intervene. A Level Five system indicates “full automation”, referring to the full-time performance by an automated driving system of all aspects of the dynamic driving task under all roadway and environmental conditions that can be managed by a human driver. The novel aspects of the present disclosure are also applicable to non-autonomous vehicles.

As shown, the vehicle 10 generally includes a propulsion system 20, a transmission system 22, a steering system 24, a brake system 26, a sensor system 28, an actuator system 30, at least one data storage device 32, a vehicle controller 34, and a wireless communication module 36. In an embodiment in which the vehicle 10 is an electric vehicle, there may be no transmission system 22. The propulsion system 20 may, in various embodiments, include an internal combustion engine, an electric machine such as a traction motor, and/or a fuel cell propulsion system. The transmission system 22 is configured to transmit power from the propulsion system 20 to the vehicle's front wheels 16 and rear wheels 18 according to selectable speed ratios. According to various embodiments, the transmission system 22 may include a step-ratio automatic transmission, a continuously-variable transmission, or other appropriate transmission. The brake system 26 is configured to provide braking torque to the vehicle's front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18. While depicted as including a steering wheel for illustrative purposes, in some embodiments contemplated within the scope of the present disclosure, such as for a fully autonomous vehicle, the steering system 24 may not include a steering wheel.

The sensor system 28 includes one or more sensing devices 40*a*-40*n* that sense observable conditions of the exterior environment and/or the interior environment of the autonomous vehicle 10. The sensing devices 40*a*-40*n* can include, but are not limited to, radars, lidars, global positioning systems, optical cameras, thermal cameras, ultrasonic sensors, and/or other sensors. The cameras can include two or more digital cameras spaced at a selected distance from each other, in which the two or more digital cameras are used to obtain stereoscopic images of the surrounding environment in order to obtain a three-dimensional image or map. The plurality of sensing devices 40*a*-40*n* is used to determine information about an environment surrounding the vehicle 10. In an exemplary embodiment, the plurality of sensing devices 40*a*-40*n* includes at least one of a motor speed sensor, a motor torque sensor, an electric drive motor voltage and/or current sensor, an accelerator pedal position sensor, a coolant temperature sensor, a cooling fan speed sensor, and a transmission oil temperature sensor. In another exemplary embodiment, the plurality of sensing devices 40*a*-40*n* further includes sensors to determine information about the environment surrounding the vehicle 10, for example, an ambient air temperature sensor, a barometric pressure sensor, and/or a photo and/or video camera which is positioned to view the environment in front of the vehicle 10. In another exemplary embodiment, at least one of the plurality of sensing devices 40*a*-40*n* is capable of measuring distances in the environment surrounding the vehicle 10.

In a non-limiting example wherein the plurality of sensing devices 40*a*-40*n* includes a camera, the plurality of sensing devices 40*a*-40*n* measures distances using an image processing algorithm configured to process images from the camera and determine distances between objects. In another non-limiting example, the plurality of vehicle sensors 40*a*-40*n* includes a stereoscopic camera having distance measurement capabilities. In one example, at least one of the plurality of sensing devices 40*a*-40*n* is affixed inside of the vehicle 10, for example, in a headliner of the vehicle 10, having a view through the windshield of the vehicle 10. In another example, at least one of the plurality of sensing devices 40*a*-40*n* is a camera affixed outside of the vehicle 10, for example, on a roof of the vehicle 10, having a view of the environment surrounding the vehicle 10 and adapted to collect information (images) related to the environment outside the vehicle 10. It should be understood that various additional types of sensing devices, such as, for example, LiDAR sensors, ultrasonic ranging sensors, radar sensors, and/or time-of-flight sensors are within the scope of the present disclosure. The actuator system 30 includes one or more actuator devices 42*a*-42*n* that control one or more vehicle 10 features such as, but not limited to, the propulsion system 20, the transmission system 22, the steering system 24, and the brake system 26.

The vehicle controller 34 includes at least one processor 44 and a computer readable storage device or media 46. The at least one data processor 44 can be any custom made or commercially available processor, a central processing unit (CPU), a graphics processing unit (GPU), an auxiliary processor among several processors associated with the vehicle controller 34, a semi-conductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the at least one data processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the at least one processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the vehicle controller 34 are embodied in a trajectory planning system and, when executed by the at least one data processor 44, generates a trajectory output that addresses kinematic and dynamic constraints of the environment. For example, the instructions receive as input process sensor and map data. The instructions perform a graph-based approach with a customized cost function to handle different road scenarios in both urban and highway roads.

The wireless communication module 36 is configured to wirelessly communicate information to and from other remote entities 48, such as but not limited to, other vehicles ("V2V" communication,) infrastructure ("V2I" communication), remote systems, remote servers, cloud computers, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The vehicle controller 34 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

Figure 2:
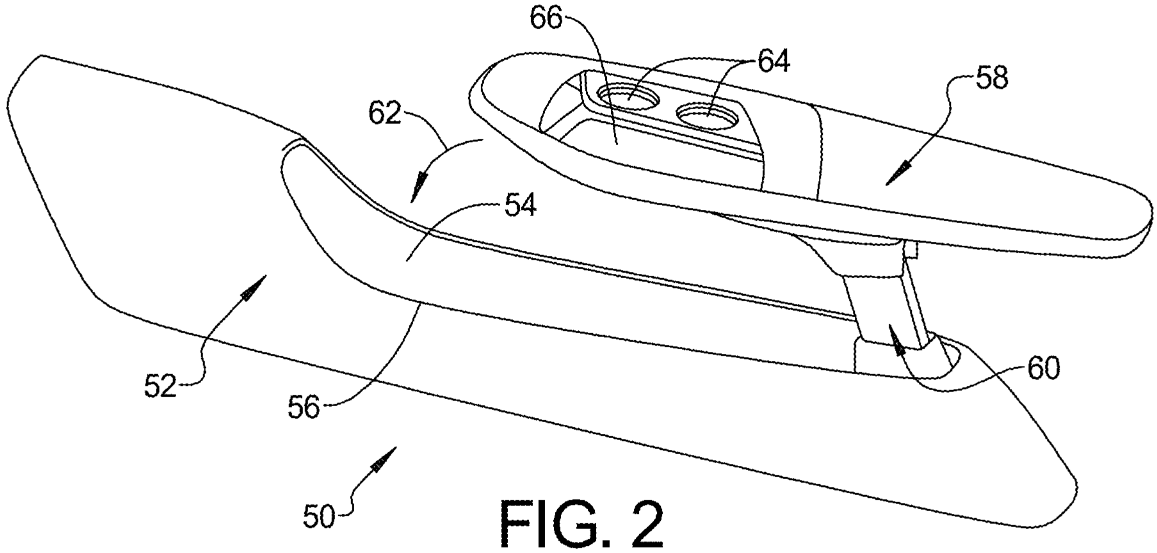
FIG. 2 is a schematic perspective view of a center console according to an exemplary embodiment wherein the armrest assembly is in a fully raised position.

Referring to FIG. 2, a center console 50 for a vehicle 10 according to the novel features of the present disclosure includes a console 52 defining a storage compartment 54 and having an opening 56 allowing access to the storage compartment 54. The console 52 may be formed from any suitable material and may comprise multiple pieces or be a single composite formed by polymer molding techniques known in the industry.

The center console 50 includes an armrest assembly 58 moveably supported, by an articulating support structure 60, on the console 52. The articulating support structure 60 is adapted to selectively move the armrest assembly 58, as shown by arrow 62, between a fully raised position, wherein the armrest assembly 58 is supported above the console 52 and the opening 56 to the storage compartment 54 is accessible, as shown in FIG. 1, and a fully lowered position, wherein the armrest assembly 58 is positioned against the console 52 and covers the opening 56 to the storage compartment 54, as shown in FIG. 2.

As shown, the armrest assembly 58 includes design features, such as cup holders 64 and a support tray 66 for small personal items such as a cell phone. It should be understood that the design details of the armrest assembly 58 may include unique or customizable design features without departing from the novel features of the present disclosure.

The articulating support structure 60 is adapted to maintain a horizontal orientation of the armrest assembly 58 at the fully raised position, the fully lowered position and throughout movement between the fully raised position and the fully lowered position. Thus, the armrest assembly 58 is substantially horizontal, and the articulating support structure 60 maintains that horizontal orientation throughout movement. In an exemplary embodiment, the articulating support structure 60 is mounted to structure of the vehicle 10 within the storage compartment 54 and when the armrest assembly 58 is in the fully lowered position, the articulating support structure 60 is positioned entirely within the storage compartment 54 of the console 52. Further, when the armrest assembly 58 is in the fully lowered position, the articulating support structure 60 functions to lock the armrest assembly 58 in the fully lowered position, thus securing belongings stored within the storage compartment 54. The locking features of the articulating support structure 60 will be discussed in more detail below.

Figure 4A:
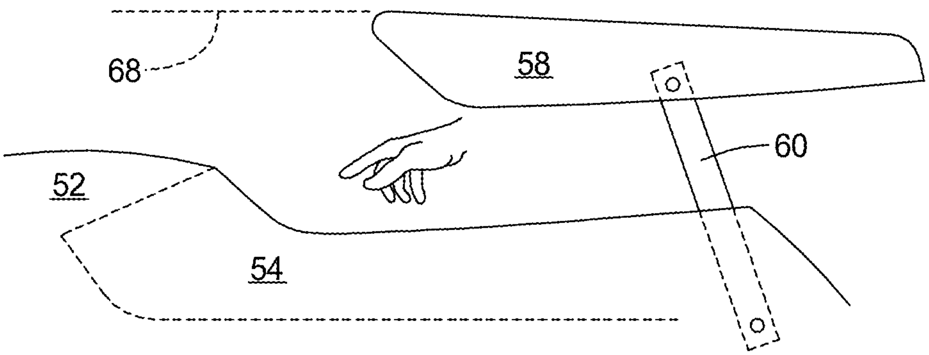
FIG. 4A is a schematic side view of the center console shown in FIG. 1, wherein the armrest assembly is in the fully raised position.
Figure 4B:
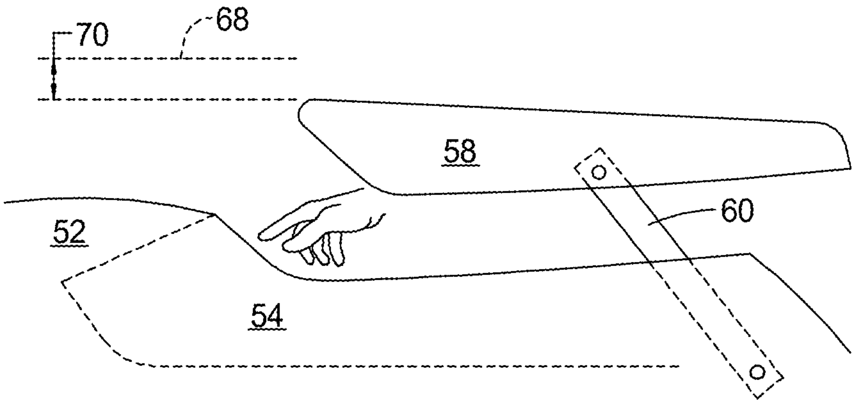
FIG. 4B is a schematic side view of the center console shown in FIG. 1, wherein the armrest assembly is in an intermittent position.
Figure 4C:
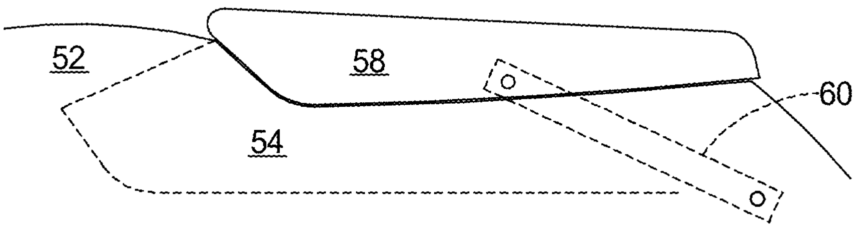
FIG. 4C is a schematic side view of the center console shown in FIG. 1, wherein the armrest assembly is in the fully lowered position.

Referring to FIG. 4A, when in the fully raised position, the articulating support structure 60 supports the armrest assembly 58 above the opening 56 within the console 52. This puts the armrest assembly 58 at a maximum height 68 above the console 52, and supports the armrest assembly 58 above the opening 56 such that occupants within the vehicle 10 can reach into the storage compartment 54 and place personal belongings in the storage compartment 54. Referring to FIG. 4B, the articulating support structure 60 is adapted to support the armrest assembly 58 at any position between the fully raised and fully lowered position. The articulating support structure 60 can be selectively actuated by an occupant within the vehicle 10 to either raise or lower the armrest assembly 58. As shown in FIG. 4B, the articulating support structure 60 has been selectively actuated to lower the armrest assembly 58 from the fully raised position, shown in FIG. 4A, to an intermittent position between the fully raised position and the fully lowered position. Thus, the height of the armrest assembly 58 has been lowered by a distance 70 from the maximum height 68. This allows occupants within the vehicle 10 to selectively adjust the height of the armrest assembly 58 to accommodate occupants of different height and/or different preferences, while still leaving the opening 56 to the storage compartment 54 accessible to the occupant or occupants. Referring to FIG. 4C, when in the fully lowered position, the armrest assembly 58 conforms to and covers the opening 56 within the console 52, thereby closing the storage compartment 54 and securing personal items therein.

Figure 5:
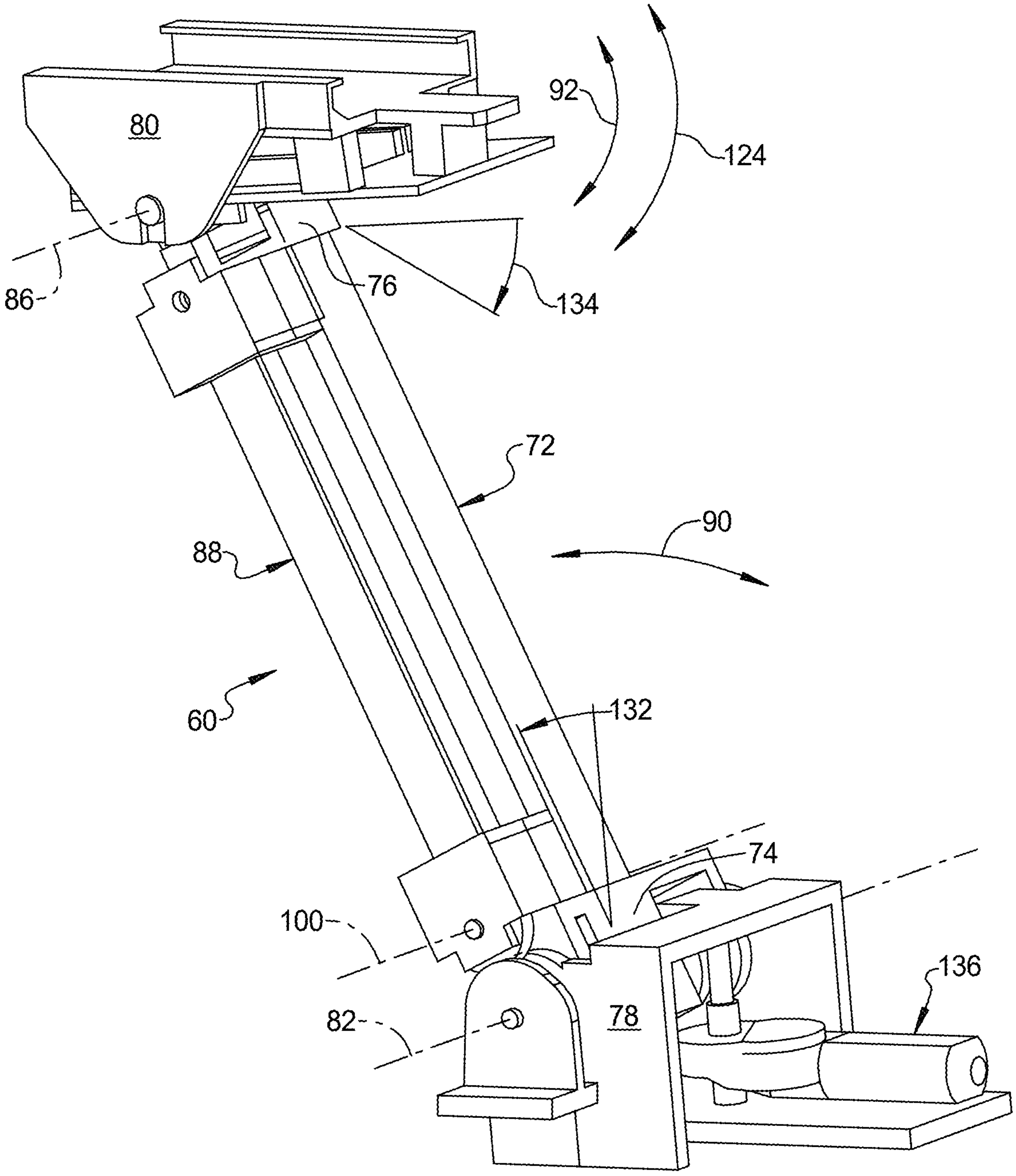
FIG. 5 is a schematic perspective view of an articulating support structure according to an exemplary embodiment.
Figure 6:
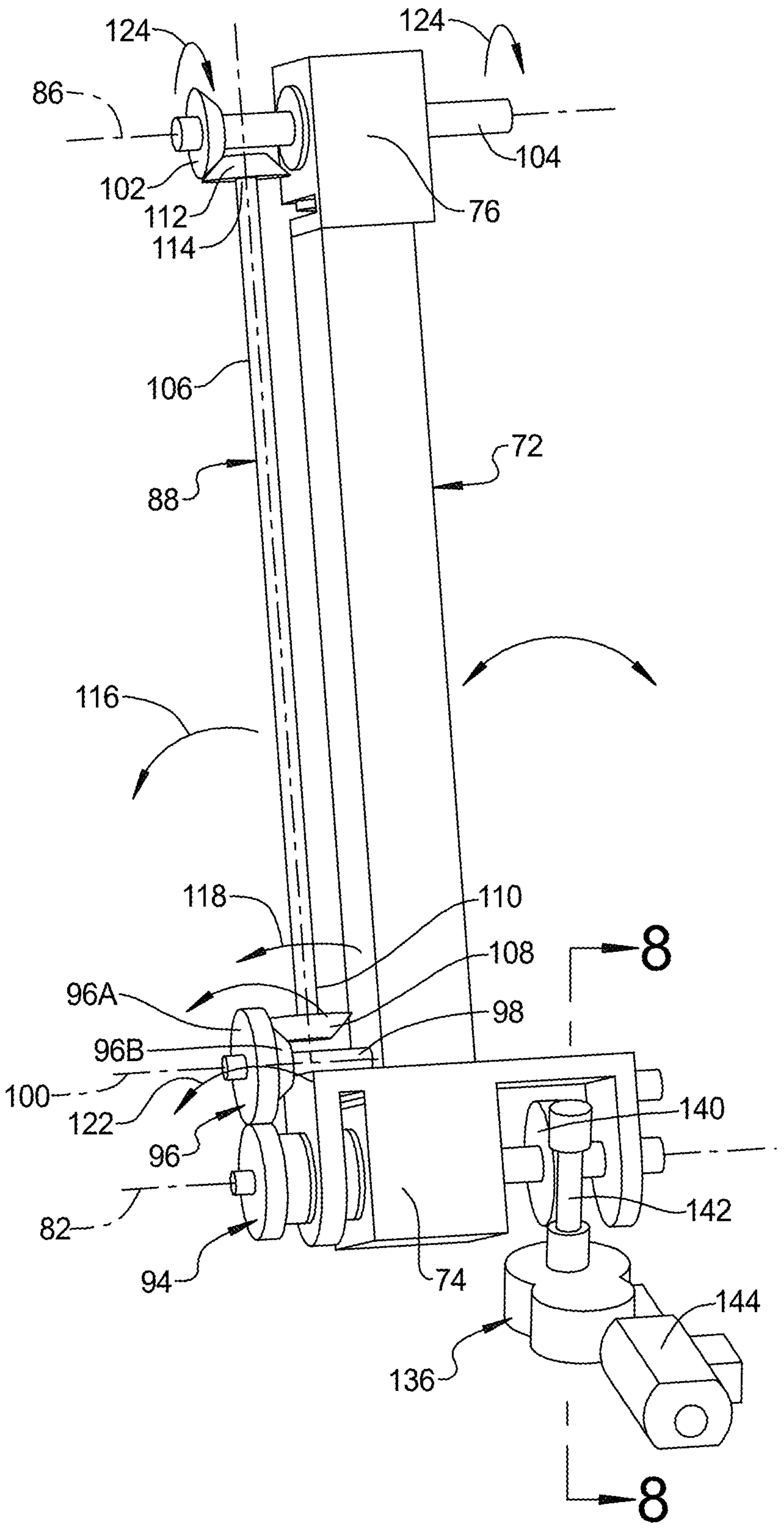
FIG. 6 is a schematic perspective view of the articulating support structure wherein a geared linkage is shown.

Referring to FIG. 5 and FIG. 6, the articulating support structure 60 includes a connecting rod 72 having a lower distal end 74 and an upper distal end 76, the lower distal end 74 of the connecting rod 72 pivotally supported on a fixed base 78 within the storage compartment 54 of the console 52. The articulating support structure 60 further includes a support plate 80 pivotally mounted to the upper distal end 76 of the connecting rod 72 and adapted to support the armrest assembly 58 thereon. The connecting rod 72 is pivotally moveable relative to the fixed base 78 and the console 52 about a first axis 82 and, referring to FIG. 7, within a first horizontal plane 84 passing through line 84 perpendicular to the drawing sheet. The support plate 80 is pivotally moveable relative to the connecting rod 72 about a second axis 86 and within the first horizontal plane 84 passing through line 84 perpendicular to the drawing sheet.

The articulating support structure 60 further includes a geared linkage 88 interconnecting the fixed base 78 to the support plate 80, wherein when the connecting rod 72 pivots relative to the fixed base 78, as shown by arrow 90, the geared linkage 88 is adapted to pivot the support plate 80 relative to the connecting rod 72 in a direction opposite the pivotal movement of the connecting rod 72, as shown by arrow 92.

Figure 7:
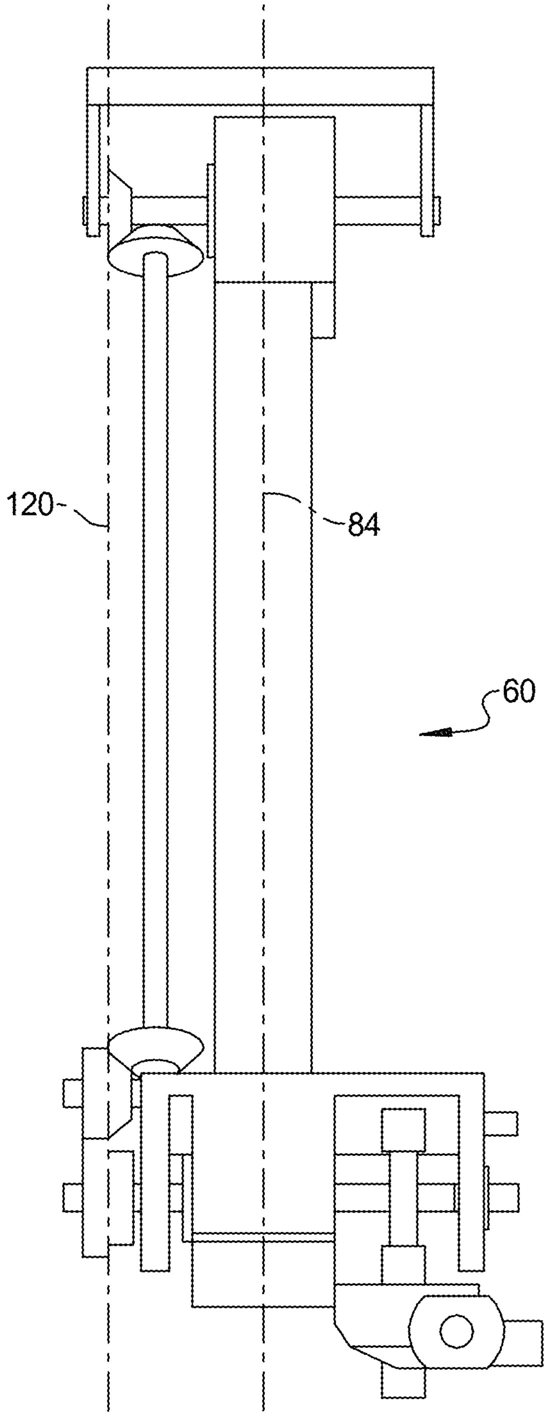
FIG. 7 is a schematic front view of the articulating support structure shown in FIG. 6 illustrating first and second horizontal planes passing through the articulating support structure perpendicular to the drawing sheet.

Referring to FIG. 6 and FIG. 7, the geared linkage 88 includes a fixed base gear 94 that is fixedly mounted (does not rotate) to the fixed base 78 and is centered on the first axis 82. A lower connecting rod gear 96 is rotatably supported on a lower connecting rod shaft 98 extending from the connecting rod 72 for rotation about a third axis 100. The lower connecting rod gear 96 includes a spur gear portion 96A in engagement with the fixed base gear 94 and a bevel gear portion 96B.

An upper connecting rod bevel gear 102 is fixedly mounted onto an upper connecting rod shaft 104 that is rotatably supported at the upper distal end 76 of the connecting rod 72 for rotation of the upper connecting rod bevel gear 102 and the upper connecting rod shaft 104 about the second axis 86. The support plate 80 is fixedly mounted onto the upper connecting rod shaft 104, wherein the upper connecting rod bevel gear 102, the upper connecting rod shaft 104 and the support plate 80 rotate unitarily about the second axis 86.

A bevel gear shaft 106 extends between the bevel gear portion 96B of the lower connecting rod gear 96 and the upper connecting rod bevel gear 102, the bevel gear shaft 106 having a first bevel gear 108 fixedly attached to a first distal end 110 of the bevel gear shaft 106 and engaged with the bevel gear portion 96B of the lower connecting rod gear 96 and a second bevel gear 112 fixedly attached to a second distal end 114 of the bevel gear shaft 106 and engaged with the upper connecting rod bevel gear 102.

Pivotal motion of the connecting rod 72 relative to the fixed base 78 in a first rotational direction (counter clockwise as viewed from the left in FIG. 6, as indicated by arrow 116) about the first axis 82 within the first horizontal plane 84 causes rotation of the lower connecting rod gear 96 in the first rotational direction (counter clockwise as viewed from the left in FIG. 6, as indicated by arrow 118) about the third axis 100 and within a second horizontal plane 120 passing through line 120 perpendicular to the drawing sheet and parallel to the first horizontal plane 84, as the lower connecting rod gear 96 walks around the fixed base gear 94, as indicated by arrow 122.

Rotation of the lower connecting rod gear 96 in the first direction within the second horizontal plane 120 is transferred, through the bevel gear shaft 106, via geared engagement between the bevel gear portion 96B of the lower connecting rod gear 96 and the first bevel gear 108 and geared engagement between the second bevel gear 112 and the upper connecting rod bevel gear 102, wherein the upper connecting rod bevel gear 102 rotates in a second direction, opposite the first direction (clockwise as viewed from the left in FIG. 6, as indicated by arrow 124), within the second horizontal plane 120 about the second axis 86.

Referring again to FIG. 5 and FIG. 6, the upper connecting rod bevel gear 102, the upper connecting rod shaft 104 and the support plate 80 rotate unitarily about the second axis 86, thus, rotation of the upper connecting rod bevel gear 102 in the second direction causes rotation of the upper connecting rod shaft 104, the support plate 80, and the armrest assembly 58 supported on the support plate 80, in the second direction within the first horizontal plane 84, as indicated by arrow 124.

In an exemplary embodiment, the geared linkage 88 interconnecting the fixed base 78 to the support plate 80, has a cumulative gear ratio of one-to-one (1:1). When the connecting rod 72 pivots relative to the fixed base 78 about the first axis 82, as indicated by arrow 90, and the support plate 80 pivots relative to the connecting rod 72 about the second axis 86 in a direction opposite the pivotal movement of the connecting rod 72, as indicated by arrow 92, the net angular rotation of the connecting rod 72 and support plate 80 are equal. Thus, when the connecting rod 72 pivots a first angular distance 132, the support plate 80 pivots, in the opposite direction, a second angular distance 134, equal to the first angular distance 132.

Figure 3:
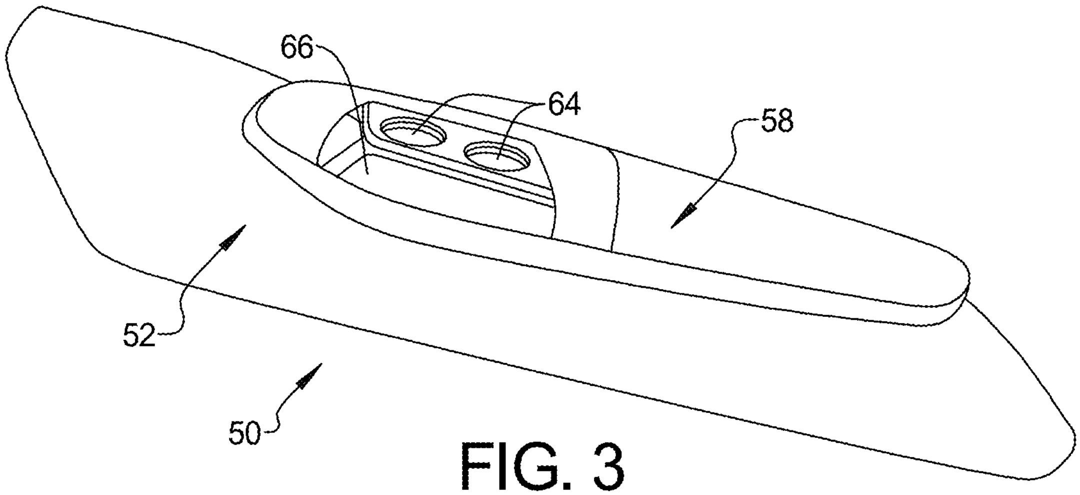
FIG. 3 is a schematic perspective of the center console of FIG. 2, wherein the armrest assembly is in a fully lowered position.

In an exemplary embodiment, the articulating support structure 60 includes only a single powered drive unit 136 that is selectively actuatable to move the armrest assembly 58 back and forth between the fully raised position, a shown in FIG. 2 and FIG. 4A, and the fully lowered position, as shown in FIG. 3 and FIG. 4C, and to support the armrest assembly 58 at any position between and including the fully raised position and the fully lowered position. Thus, the single powered drive unit 136 actuates both the pivotal movement of the connecting rod 72 about the first axis 82 and pivotal movement of the support plate 80 and armrest assembly 58 about the second axis 86.

Figure 8:
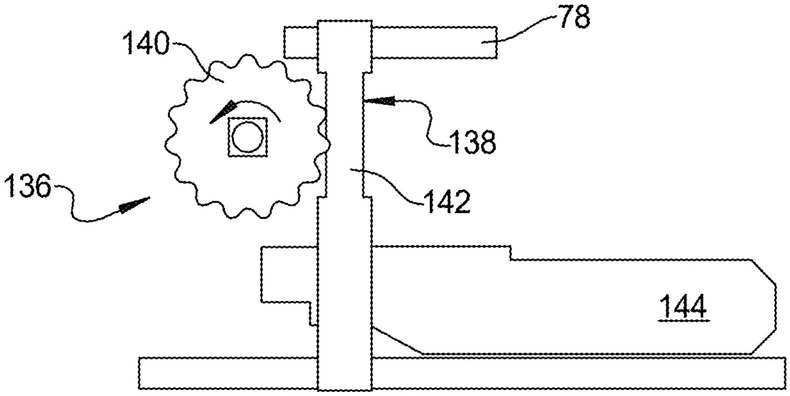
FIG. 8 is a sectional view taken along the line labelled FIG. 8-FIG. 8 in FIG. 6.

Referring to FIG. 7 and FIG. 8, the single powered drive unit 136 is adapted to prevent movement of the armrest assembly 58 due to upward or downward load on the armrest assembly 58 whenever the single powered drive unit 136 is not being selectively actuated to move the connecting rod 72. In an exemplary embodiment, the powered drive unit 136 includes a worm gear assembly 138 including a worm gear 140 fixedly mounted to the lower distal end 74 of the connecting rod 72, wherein the worm gear 140 and the connecting rod 72 rotate unitarily about the first axis 82. The worm gear assembly 138 further includes a worm 142 engaged with the worm gear 140 and rotatably connected to a motor 144 adapted to selectively rotate the worm 142. Rotation of the worm 142, by the motor 144, causes corresponding rotation of the worm gear 140 and the connecting rod 72 about the first axis 82.

Attempted rotation of the worm gear 140, via load upward or downward on the armrest assembly 58, causes the worm gear assembly 138 to lock up, preventing rotation of the connecting rod 72 and movement of the armrest assembly 58 due to upward or downward load on the armrest assembly 58. In worm gear assemblies, power is transmitted through sliding between flanks of the worm 142 and gear teeth of the worm gear 140 (i.e. the flanks slide onto the gear teeth as a screw). Worm gear assemblies are ultimately a special case of screw gears. In contrast to screw gears, which generate a point-shaped flank contact, worm gear assemblies have a linear flank contact, resulting in higher power transmission and higher transmission ratios. The worm gear assembly 138 may comprise a cylindrical worm gear or a globoid worm gear.

The worm gear assembly 138 is self-locking, wherein torque transmission can only take place in one direction. The worm gear assembly 138 can only be set in motion by input from the worm 142. The worm gear assembly 138 cannot be set in motion by input from the worm gear 140, and attempted rotation of the worm gear 140, due to pivotal pressure on the connecting rod 72 due to upward or downward load on the armrest assembly 58, will cause the worm gear assembly 138 to lock up, preventing rotation of the worm gear 140, preventing pivotal movement of the connecting rod 72, and keeping the armrest assembly 58 secured in position.

This self-locking is due to the screw motion of the worm thread at low lead angles. Thus the worm 142 can drive the worm gear 140 by its helical flank motion, but, no motion can be achieved in the other direction. The contact force of the worm gear flanks against the thread flanks of the worm 142 is large and the lead angle is small, such that the resulting frictional force prevents rotational motion. As used herein, the worm gear assembly 138 ensures that movement of the articulating support assembly 60 is automatically prevented when the motor 144 is not being actuated by a user within the vehicle 10. Thus, a user may place personal items within the storage compartment 54 and selectively actuate the powered drive unit 136 to lower the armrest assembly 58 to the fully lowered position, thus closing off the storage compartment 54 and securing the user's personal items therein. When the user turns the vehicle 10 off and leaves the vehicle 10, no power is provided to the powered drive unit 136, wherein, if someone attempts to pull the armrest assembly 58 upward to access the storage compartment 54, the geared linkage 88 and the powered drive unit 136 will prevent movement of the armrest assembly 58, thereby keeping the user's personal items safely secured within the storage compartment 54. This self-locking feature of the powered drive unit 136 also provides for securing the armrest assembly 58 at any position selected by a user, including, the fully raised position, the fully lowered position or any position therebetween. Thus, once a user within the vehicle 10 selectively actuates the powered drive unit 136 to raise or lower the armrest assembly 58 to a desired height, the geared linkage 88 and the powered drive unit 136 will provide solid support to keep the armrest assembly 58 at that position.

Figure 9:
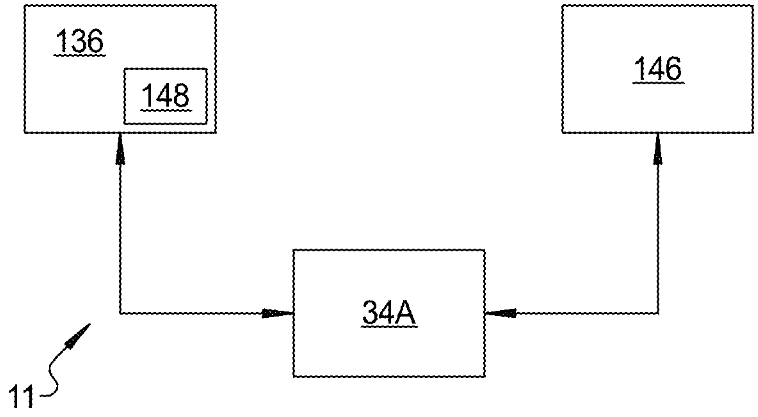
FIG. 9 is a schematic diagram of a powered drive unit, a system controller and a switch for the center console.

Referring to FIG. 9, the powered drive unit 136 of the center console 50 is in communication with a system controller 34A. The system controller 34A may be the vehicle controller 34, or the system controller 34A may be a separate controller in communication with the vehicle controller 34. The system controller 34A is further in communication with a switch 146 positioned within the vehicle 10 and adapted to allow a user within the vehicle 10 to selectively actuate the powered drive unit 136 to raise or lower the armrest assembly 58 to the user's preferences. In an exemplary embodiment, the powered drive unit 136 includes a force sensor 148 adapted to monitor resistance when the articulating support structure 60 moves the armrest assembly 58 back and forth between the fully raised and fully lowered positions, and to stop movement of the armrest assembly 58 if measured force exceeds a pre-determined threshold.

A center console of the present disclosure offers several advantages. These include allowing an occupant within the vehicle 10 to selectively move the armrest assembly 58 between a fully raised position and a fully lowered position, wherein when the armrest assembly 58 is in the fully lowered position the armrest assembly 58 closes off a storage compartment 54 within the center console 50, and when the armrest assembly 58 is at the fully raised position, the fully lowered position or any position therebetween, the armrest assembly 58 is automatically locked in place and cannot be manually moved upward or downward between the fully lowered and fully raised positions.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A center console for a vehicle, comprising:

a console defining a storage compartment and having an opening allowing access to the storage compartment; and an armrest assembly moveably supported, by an articulating support structure, on the console, the articulating support structure adapted to selectively move the armrest assembly between a fully raised position, wherein the armrest assembly is supported above the console and the opening to the storage compartment is accessible and a fully lowered position, wherein the armrest assembly is positioned against the console and covers the opening to the storage compartment;

wherein, the articulating support structure includes:

a connecting rod having a lower distal end and an upper distal end, the lower distal end of the connecting rod pivotally supported on a fixed base within the storage compartment of the console;

a support plate pivotally mounted to the upper distal end of the connecting rod and adapted to support the armrest assembly thereon, the connecting rod being pivotally moveable relative to the fixed base and the center console about a first axis and within a first horizontal plane, and the support plate being pivotally moveable relative to the connecting rod about a second axis and within the first horizontal plane; and a geared linkage interconnecting the fixed base to the support plate, wherein when the connecting rod pivots relative to the fixed base, the geared linkage is adapted to pivot the support plate relative to the connecting rod in a direction opposite the pivotal movement of the connecting rod and to maintain a horizontal orientation of the armrest assembly at the fully raised position, the fully lowered position and throughout movement between the fully raised position and the fully lowered position.

2. The center console of claim 1, wherein, when the armrest assembly is in the fully lowered position, the articulating support structure is positioned entirely within the storage compartment of the console.

3. The center console of claim 2, wherein, when the armrest assembly is in the fully lowered position, the articulating support structure functions to lock the armrest assembly in the fully lowered position and securing belonging stored within the storage compartment.

4. The center console of claim 3, wherein the geared linkage includes:

a fixed base gear fixedly mounted to the fixed base and centered on the first axis;

a lower connecting rod gear rotatably supported on a lower connecting rod shaft extending from the connecting rod for rotation about a third axis, the lower connecting rod gear including a spur gear portion in engagement with the fixed base gear and a bevel gear portion;

an upper connecting rod bevel gear fixedly mounted onto an upper connecting rod shaft that is rotatably supported at the upper distal end of the connecting rod for rotation about the second axis, the support plate being fixedly mounted onto the upper connecting rod shaft; and a bevel gear shaft extending between the bevel gear portion of the lower connecting rod gear and the upper connecting rod bevel gear, the bevel gear shaft having a first bevel gear fixedly attached to a first distal end of the bevel gear shaft and engaged with the bevel gear portion of the lower connecting rod gear and a second bevel gear fixedly attached to a second distal end of the bevel gear shaft and engaged with the upper connecting rod bevel gear; and wherein:

pivotal motion of the connecting rod relative to the fixed base in a first rotational direction about the first axis within the first horizontal plane causes rotation of the lower connecting rod gear in the first rotational direction within a second horizontal plane that is parallel to the first horizontal plane as the lower connecting rod gear rotates about the third axis and walks around the fixed base gear;

rotation of the lower connecting rod gear in the first direction within the second horizontal plane is transferred, through the bevel gear shaft, via geared engagement between the bevel gear portion of the lower connecting rod gear and the first bevel gear and geared engagement between the second bevel gear and the upper connecting rod bevel gear, wherein the upper connecting rod bevel gear rotates in a second direction, opposite the first direction, within the second horizontal plane about the second axis; and rotation of the upper connecting rod bevel gear in the second direction causes rotation of the upper connecting rod shaft, the support plate, and the armrest assembly supported on the support plate, in the second direction within the first horizontal plane.

5. The center console of claim 4, wherein the geared linkage interconnecting the fixed base to the support plate, has a cumulative gear ratio of one-to-one (1:1), wherein when the connecting rod pivots relative to the fixed base about the first axis, and the support plate pivots relative to the connecting rod about the second axis in an direction opposite the pivotal movement of the connecting rod, the net angular rotation of the connecting rod and support plate are equal.

6. The center console of claim 5, wherein the articulating support structure includes only a single powered drive unit that is selectively actuatable to move the armrest assembly back and forth between the fully raised position and the fully lowered position, and to support the armrest assembly at any position between and including the fully raised position and the fully lowered position.

7. The center console of claim 6, wherein the single powered drive unit is adapted to prevent movement of the armrest assembly due to upward or downward load on the armrest assembly.

8. The center console of claim 7, wherein the powered drive unit includes:

a worm gear assembly including:

a worm gear fixedly mounted to the lower distal end of the connecting rod; and a worm engaged with the worm gear, the worm connected to a motor adapted to selectively rotate the worm; and wherein, rotation of the worm, by the motor, causes corresponding rotation of the worm gear and the connecting rod, and attempted rotation of the worm gear, via load upward or downward on the armrest assembly, causes the worm gear assembly to lock up, preventing rotation of the connecting rod and movement of the armrest assembly due to upward or downward load on the armrest assembly.

9. The center console of claim 8, wherein the powered drive unit includes a force sensor adapted to monitor resistance when the articulating support structure moves the armrest assembly back and forth between the fully raised and fully lowered positions, and to stop movement of the armrest assembly if measured force exceeds a pre-determined threshold.

10. The center console of claim 1, wherein when in the fully raised position, the armrest assembly is supported above the console and the opening, at a maximum height above the console, such that an occupant within the vehicle can reach within the storage compartment.

11. A vehicle having a center console, the center console, comprising:

a console defining a storage compartment and having an opening allowing access to the storage compartment; and an armrest assembly moveably supported, by an articulating support structure, on the center console, the articulating support structure adapted to selectively move the armrest assembly between a fully raised position, wherein the armrest assembly is supported above the center console and the opening to the storage compartment is accessible and a fully lowered position, wherein the armrest assembly is positioned against the center console and covers the opening to the storage compartment;

wherein, the articulating support structure includes:

a connecting rod having a lower distal end and an upper distal end, the lower distal end of the connecting rod pivotally supported on a fixed base within the storage compartment of the console;

a support plate pivotally mounted to the upper distal end of the connecting rod and adapted to support the armrest assembly thereon, the connecting rod being pivotally moveable relative to the fixed base and the center console about a first axis and within a first horizontal plane, and the support plate being pivotally moveable relative to the connecting rod about a second axis and within the first horizontal plane; and a geared linkage interconnecting the fixed base to the support plate, wherein when the connecting rod pivots relative to the fixed base, the geared linkage is adapted to pivot the support plate relative to the connecting rod in a direction opposite the pivotal movement of the connecting rod and maintain a horizontal orientation of the armrest assembly at the fully raised position, the fully lowered position and throughout movement between the fully raised position and the fully lowered position.

12. The vehicle of claim 11, wherein, when the armrest assembly is in the fully lowered position, the articulating support structure is positioned entirely within the storage compartment of the console.

13. The vehicle of claim 12, wherein, when the armrest assembly is in the fully lowered position, the articulating support structure functions to lock the armrest assembly in the fully lowered position and securing belonging stored within the storage compartment.

14. The vehicle of claim 13, wherein the geared linkage includes:

a fixed base gear fixedly mounted to the fixed base and centered on the first axis;

a lower connecting rod gear rotatably supported on a lower connecting rod shaft extending from the connecting rod for rotation about a third axis, the lower connecting rod gear including a spur gear portion in engagement with the fixed base gear and a bevel gear portion;

an upper connecting rod bevel gear fixedly mounted onto an upper connecting rod shaft that is rotatably supported at the upper distal end of the connecting rod for rotation about the second axis, the support plate being fixedly mounted onto the upper connecting rod shaft; and a bevel gear shaft extending between the bevel gear portion of the lower connecting rod gear and the upper connecting rod bevel gear, the bevel gear shaft having a first bevel gear fixedly attached to a first distal end of the bevel gear shaft and engaged with the bevel gear portion of the lower connecting rod gear and a second bevel gear fixedly attached to a second distal end of the bevel gear shaft and engaged with the upper connecting rod bevel gear; and wherein:

pivotal motion of the connecting rod relative to the fixed base in a first rotational direction about the first axis within the first horizontal plane causes rotation of the lower connecting rod gear in the first rotational direction within a second horizontal plane that is parallel to the first horizontal plane as the lower connecting rod gear rotates about the third axis and walks around the fixed base gear;

rotation of the lower connecting rod gear in the first direction within the second horizontal plane is transferred, through the bevel gear shaft, via geared engagement between the bevel gear portion of the lower connecting rod gear and the first bevel gear and geared engagement between the second bevel gear and the upper connecting rod bevel gear, wherein the upper connecting rod bevel gear rotates in a second direction, opposite the first direction, within the second horizontal plane about the second axis; and rotation of the upper connecting rod bevel gear in the second direction causes rotation of the upper connecting rod shaft, the support plate, and the armrest assembly supported on the support plate, in the second direction within the first horizontal plane.

15. The vehicle of claim 14, wherein the geared linkage interconnecting the fixed base to the support plate, has a cumulative gear ratio of one-to-one (1:1), wherein when the connecting rod pivots relative to the fixed base about the first axis, and the support plate pivots relative to the connecting rod about the second axis in an direction opposite the pivotal movement of the connecting rod, the net angular rotation of the connecting rod and support plate are equal.

16. The vehicle of claim 15, wherein the articulating support structure includes only a single powered drive unit that is selectively actuatable to move the armrest assembly back and forth between the fully raised position and the fully lowered position, and to support the armrest assembly at any position between and including the fully raised position and the fully lowered position.

17. The vehicle of claim 16, wherein the single powered drive unit is adapted to prevent movement of the armrest assembly due to upward or downward load on the armrest assembly.

18. The vehicle of claim 17, wherein the powered drive unit includes:

a worm gear assembly including:

a worm gear fixedly mounted to the lower distal end of the connecting rod; and a worm engaged with the worm gear, the worm connected to a motor adapted to selectively rotate the worm;

wherein, rotation of the worm, by the motor, causes corresponding rotation of the worm gear and the connecting rod, and attempted rotation of the worm gear, via load upward or downward on the armrest assembly, causes the worm gear assembly to lock up, preventing rotation of the connecting rod and movement of the armrest assembly due to upward or downward load on the armrest assembly; and a force sensor adapted to monitor resistance when the articulating support structure moves the armrest assembly back and forth between the fully raised and fully lowered positions, and to stop movement of the armrest assembly if measured force exceeds a pre-determined threshold.

19. The vehicle of claim 11, wherein when in the fully raised position, the armrest assembly is supported above the console and the opening, at a maximum height above the console, such that an occupant within the vehicle can reach within the storage compartment.

20. A center console for a vehicle, comprising:

a console defining a storage compartment and having an opening allowing access to the storage compartment;

an armrest assembly moveably supported, by an articulating support structure, on the console, the articulating support structure adapted to selectively move the armrest assembly between a fully raised position, wherein the armrest assembly is supported above the console and the opening to the storage compartment is accessible and a fully lowered position, wherein the armrest assembly is positioned against the console, covers the opening to the storage compartment, and the articulating support structure is positioned entirely within the storage compartment of the console;

the articulating support structure including:

a connecting rod having a lower distal end and an upper distal end, the lower distal end of the connecting rod pivotally supported on a fixed base within the storage compartment of the console;

a support plate pivotally mounted to the upper distal end of the connecting rod and adapted to support the armrest assembly thereon, the connecting rod being pivotally moveable relative to the fixed base and the center console about a first axis and within a first horizontal plane, and the support plate being pivotally moveable relative to the connecting rod about a second axis and within the first horizontal plane;

a geared linkage interconnecting the fixed base to the support plate, wherein when the connecting rod pivots relative to the fixed base, the geared linkage is adapted to pivot the support plate relative to the connecting rod in a direction opposite the pivotal movement of the connecting rod;

the geared linkage including:

a fixed base gear fixedly mounted to the fixed base and centered on the first axis;

a lower connecting rod gear rotatably supported on a lower connecting rod shaft extending from the connecting rod for rotation about a third axis, the lower connecting rod gear including a spur gear portion in engagement with the fixed base gear and a bevel gear portion;

an upper connecting rod bevel gear fixedly mounted onto an upper connecting rod shaft that is rotatably supported at the upper distal end of the connecting rod for rotation about the second axis, the support plate being fixedly mounted onto the upper connecting rod shaft; and a bevel gear shaft extending between the bevel gear portion of the lower connecting rod gear and the upper connecting rod bevel gear, the bevel gear shaft having a first bevel gear fixedly attached to a first distal end of the bevel gear shaft and engaged with the bevel gear portion of the lower connecting rod gear and a second bevel gear fixedly attached to a second distal end of the bevel gear shaft and engaged with the upper connecting rod bevel gear; and wherein:

pivotal motion of the connecting rod relative to the fixed base in a first rotational direction about the first axis within the first horizontal plane causes rotation of the lower connecting rod gear in the first rotational direction within a second horizontal plane that is parallel to the first horizontal plane as the lower connecting rod gear rotates about the third axis and walks around the fixed base gear;

rotation of the lower connecting rod gear in the first direction within the second horizontal plane is transferred, through the bevel gear shaft, via geared engagement between the bevel gear portion of the lower connecting rod gear and the first bevel gear and geared engagement between the second bevel gear and the upper connecting rod bevel gear, wherein the upper connecting rod bevel gear rotates in a second direction, opposite the first direction, within the second horizontal plane about the second axis; and rotation of the upper connecting rod bevel gear in the second direction causes rotation of the upper connecting rod shaft, the support plate, and the armrest assembly supported on the support plate, in the second direction within the first horizontal plane;

a single powered drive unit that is selectively actuatable to move the armrest assembly back and forth between the fully raised position and the fully lowered position, and to support the armrest assembly at any position between and including the fully raised position and the fully lowered position;

the powered drive unit including:

a worm gear assembly including:

a worm gear fixedly mounted to the lower distal end of the connecting rod; and a worm engaged with the worm gear, the worm connected to a motor adapted to selectively rotate the worm; and wherein, rotation of the worm, by the motor, causes corresponding rotation of the worm gear and the connecting rod, and attempted rotation of the worm gear, via load upward or downward on the armrest assembly, causes the worm gear assembly to lock up, preventing rotation of the connecting rod and movement of the armrest assembly due to upward or downward load on the armrest assembly; and wherein, the articulating support structure is adapted to maintain a horizontal orientation of the armrest assembly at the fully raised position, the fully lowered position and throughout movement between the fully raised position and the fully lowered position.

* * * * *